(12) United States Patent
Mukherjee et al.

(10) Patent No.: US 12,602,274 B2
(45) Date of Patent: Apr. 14, 2026

(54) SYSTEM FOR REAL-TIME OVERLOAD DETECTION USING IMAGE PROCESSING ANALYSIS

(71) Applicant: BANK OF AMERICA CORPORATION, Charlotte, NC (US)

(72) Inventors: Maharaj Mukherjee, Poughkeepsie, NY (US); Carl M. Benda, Kannapolis, NC (US); Elvis Nyamwange, Little Elm, TX (US); Utkarsh Raj, Charlotte, NC (US); Suman Roy Choudhury, Berkeley Heights, NJ (US); Vidya Srikanth, Sunnyvale, CA (US); Colin Murphy, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 57 days.

(21) Appl. No.: 18/508,449

(22) Filed: Nov. 14, 2023

(65) Prior Publication Data

US 2024/0160513 A1 May 16, 2024

Related U.S. Application Data

(60) Provisional application No. 63/425,199, filed on Nov. 14, 2022.

(51) Int. Cl.
*G06F 11/00* (2006.01)
*G06F 11/07* (2006.01)
(Continued)

(52) U.S. Cl.
CPC ........ *G06F 11/0766* (2013.01); *G06F 11/008* (2013.01); *G06F 11/3433* (2013.01); *G06T 7/0004* (2013.01); *G06V 10/40* (2022.01); *G06T 2207/20081* (2013.01); *G06T 2207/20084* (2013.01)

(58) Field of Classification Search
CPC ... G06F 11/008; G06F 11/0766; G06V 10/40; G06T 2207/20081
See application file for complete search history.

(56) References Cited

U.S. PATENT DOCUMENTS 4,703,439 A 10/1987 Lotz
10,929,708 B2 2/2021 Syeda-Mahmood
(Continued)

FOREIGN PATENT DOCUMENTS

WO 2022001489 A1 1/2022

*Primary Examiner* — Jonathan D Gibson
(74) *Attorney, Agent, or Firm* — Moore & Van Allen PLLC; Nicholas C. Russell

(57) ABSTRACT

Systems, computer program products, and methods are described herein for real-time overload detection using image processing analysis. The present disclosure is configured to receive a first set of images associated with a device, wherein the one or more images are associated with a resiliency status of the device; deploy, using a machine learning (ML) subsystem, a trained ML model on the first set of images of the device; determine, using the trained ML model, a change in the resiliency status of the device based on the first set of images; and generate a notification indicating the change in the resiliency status of the device; and transmit control signals configured to cause a first user input device to display the notification.

17 Claims, 4 Drawing Sheets

(51) Int. Cl.
| | |
|---|---|
| *G06F 11/34* | (2006.01) |
| *G06T 7/00* | (2017.01) |
| *G06V 10/40* | (2022.01) |

(56) References Cited

U.S. PATENT DOCUMENTS

| | | | | |
|---|---|---|---|---|
| 10,963,674 | B2 | 3/2021 | Tan | |
| 11,049,233 | B2 * | 6/2021 | Kumar | H04N 23/698 |
| 11,308,353 | B2 | 4/2022 | Singh | |
| 11,494,490 | B2 | 11/2022 | Kashyap | |
| 11,494,886 | B2 * | 11/2022 | Kumar | G06T 7/0004 |
| 11,562,500 | B2 | 1/2023 | Zhang | |
| 11,656,605 | B1 * | 5/2023 | Manley | G05B 23/02 |
| | | | | 700/108 |
| 11,796,993 | B2 | 10/2023 | Minisankar | |
| 11,798,263 | B1 * | 10/2023 | Prabhudesai | G06V 10/764 |
| 11,805,006 | B2 | 10/2023 | Liu | |
| 11,893,086 | B2 | 2/2024 | Levi | |
| 2008/0019595 | A1 | 1/2008 | Eswaran | |
| 2014/0358645 | A1 | 12/2014 | Ehrman | |
| 2017/0230297 | A1 | 8/2017 | Park | |
| 2020/0151481 | A1 | 5/2020 | Yoo | |
| 2020/0226377 | A1 * | 7/2020 | Campos Macias | G06V 10/82 |
| 2021/0263728 | A1 * | 8/2021 | Farrier | G06F 17/18 |
| 2022/0083864 | A1 | 3/2022 | Laterre | |
| 2022/0092464 | A1 | 3/2022 | Wistuba | |
| 2022/0292316 | A1 | 9/2022 | Levi | |
| 2022/0358751 | A1 * | 11/2022 | Liu | G06T 7/11 |
| 2022/0400394 | A1 | 12/2022 | Eleftheriadis | |
| 2023/0095041 | A1 | 3/2023 | Wang | |
| 2023/0196096 | A1 * | 6/2023 | Milne | G06F 18/214 |
| | | | | 706/25 |
| 2024/0144566 | A1 | 5/2024 | Bagherinezhad | |
| 2024/0160513 | A1 * | 5/2024 | Mukherjee | G06V 10/774 |
| 2024/0394365 | A1 * | 11/2024 | Puhakainen | H04L 63/1433 |

* cited by examiner

100

130

140

140

110

NETWORK

140

140

140

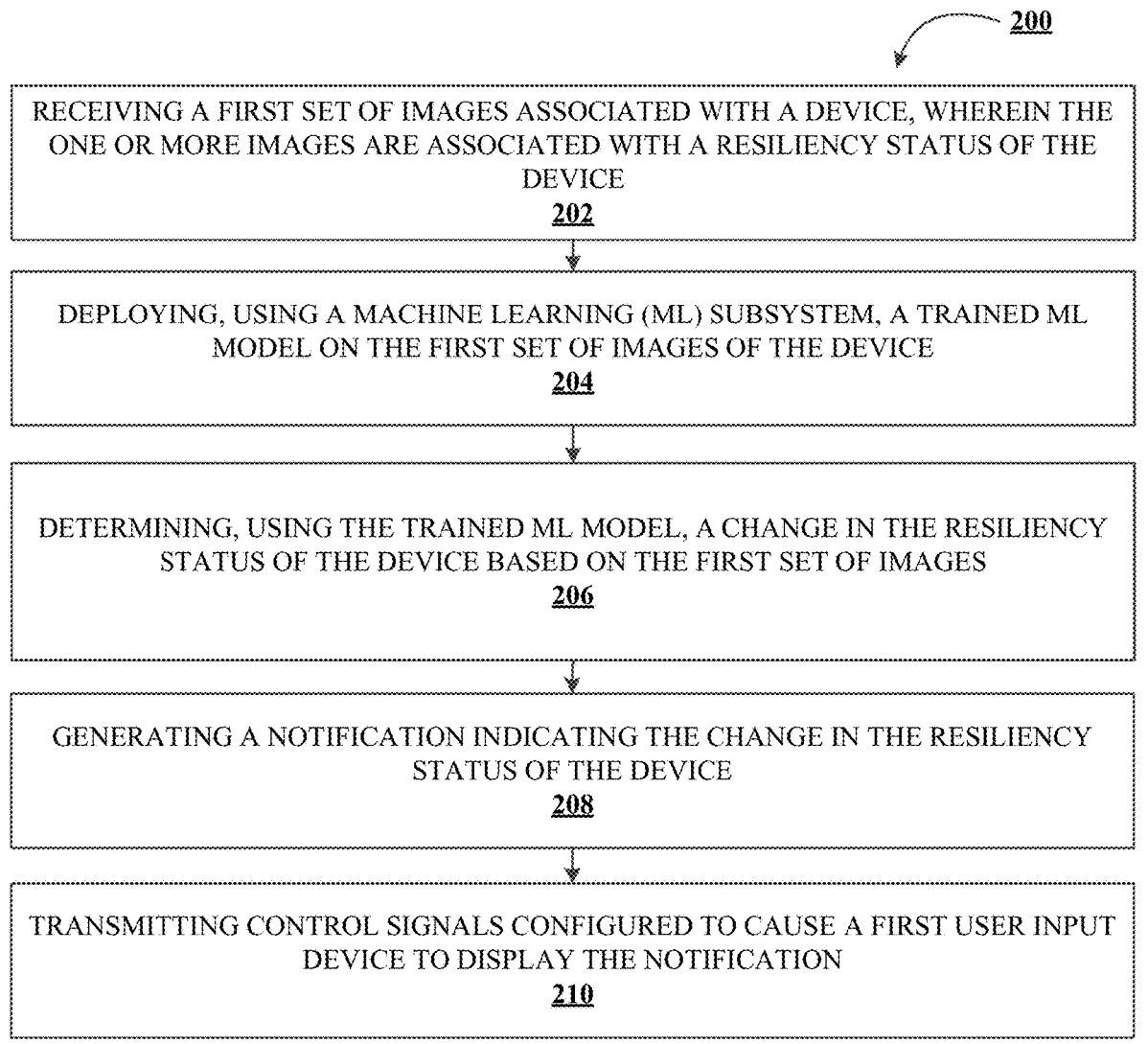

RECEIVING A FIRST SET OF IMAGES ASSOCIATED WITH A DEVICE, WHEREIN THE ONE OR MORE IMAGES ARE ASSOCIATED WITH A RESILIENCY STATUS OF THE DEVICE
202

DEPLOYING, USING A MACHINE LEARNING (ML) SUBSYSTEM, A TRAINED ML MODEL ON THE FIRST SET OF IMAGES OF THE DEVICE
204

DETERMINING, USING THE TRAINED ML MODEL, A CHANGE IN THE RESILIENCY STATUS OF THE DEVICE BASED ON THE FIRST SET OF IMAGES
206

GENERATING A NOTIFICATION INDICATING THE CHANGE IN THE RESILIENCY STATUS OF THE DEVICE
208

TRANSMITTING CONTROL SIGNALS CONFIGURED TO CAUSE A FIRST USER INPUT DEVICE TO DISPLAY THE NOTIFICATION
210

FIGURE 2

SYSTEM FOR REAL-TIME OVERLOAD DETECTION USING IMAGE PROCESSING ANALYSIS

CROSS-REFERENCE TO RELATED APPLICATIONS

This application claims the benefit of U.S. Provisional Patent Application Ser. No. 63/425,199, filed Nov. 14, 2022, entitled "System for Real-Time Overload Detection Using Image Processing Analysis", the entirety of which is incorporated herein by reference.

TECHNOLOGICAL FIELD

Example embodiments of the present disclosure relate to overload detection using image processing analysis.

BACKGROUND

Performance monitoring involves the measurement of performance over time against indicators of performance or key performance indicators.

Applicant has identified a number of deficiencies and problems associated with overload detection using image processing analysis. Through applied effort, ingenuity, and innovation, many of these identified problems have been solved by developing solutions that are included in embodiments of the present disclosure, many examples of which are described in detail herein

BRIEF SUMMARY

Systems, methods, and computer program products are provided for real-time overload detection using image processing analysis.

In one aspect, a system for real-time overload detection using image processing analysis is presented. The system comprising: a processing device; a non-transitory storage device containing instructions that, when executed by the processing device, cause the processing device to: receive a first set of images associated with a device, wherein the one or more images are associated with a resiliency status of the device; deploy, using a machine learning (ML) subsystem, a trained ML model on the first set of images of the device; determine, using the trained ML model, a change in the resiliency status of the device based on the first set of images; generate a notification indicating the change in the resiliency status of the device; and transmit control signals configured to cause a first user input device to display the notification.

In some embodiments, the instructions, when executed, further cause the processing device to: retrieve one or more sets of images associated with the device; receive, from a second user input device, one or more known resiliency statuses of the device corresponding to the one or more sets of images associated with the device; generate a first feature set using the one or more sets of images associated with the device and the one or more known resiliency statuses corresponding to the one or more sets of images associated with the device; and train an ML model using the first feature set to generate the trained ML model.

In some embodiments, the instructions, when executed, further cause the processing device to: retrieve one or more sets of images associated with one or more devices that are substantially similar to the device; receive, from the second user input device, one or more known resiliency statuses of the one or more devices corresponding to the one or more sets of images associated with the one or more devices; generate a second feature set using the one or more sets of images associated with one or more devices, and the one or more known resiliency statuses corresponding to the one or more sets of images associated with the one or more devices; and train the ML model using the second feature set to generate the trained ML model.

In some embodiments, the instructions, when executed, further cause the processing device to: train the ML model using the first feature set and the second feature set to generate the trained ML model.

In some embodiments, the first set of images are periodic snapshots representing performance telemetry of the device, wherein the first set of images are captured at period time intervals during a first time period.

In some embodiments, the first set of images is a heat map.

In some embodiments, the instructions, when executed, further cause the processing device to: determine a first resiliency status of the device, wherein the first resiliency status indicates that the device is currently operational; and determine, using the trained ML model, that resiliency status of the device has changed from the first resiliency status to a second resiliency status, wherein the second resiliency status indicates that the device is likely to malfunction based on the first set of images.

In another aspect, a computer program product for real-time overload detection using image processing analysis is presented. The computer program product comprising a non-transitory computer-readable medium comprising code causing an apparatus to: receive a first set of images associated with a device, wherein the one or more images are associated with a resiliency status of the device; deploy, using a machine learning (ML) subsystem, a trained ML model on the first set of images of the device; determine, using the trained ML model, a change in the resiliency status of the device based on the first set of images; generate a notification indicating the change in the resiliency status of the device; and transmit control signals configured to cause a first user input device to display the notification.

In yet another aspect, a method for real-time overload detection using image processing analysis is presented. The method comprising: receiving a first set of images associated with a device, wherein the one or more images are associated with a resiliency status of the device; deploying, using a machine learning (ML) subsystem, a trained ML model on the first set of images of the device; determining, using the trained ML model, a change in the resiliency status of the device based on the first set of images; generating a notification indicating the change in the resiliency status of the device; and transmitting control signals configured to cause a first user input device to display the notification.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompany- ing drawings. The components illustrated in the figures may or may not be present in certain embodiments described herein. Some embodiments may include fewer (or more) components than those shown in the figures.

Figure 1A:
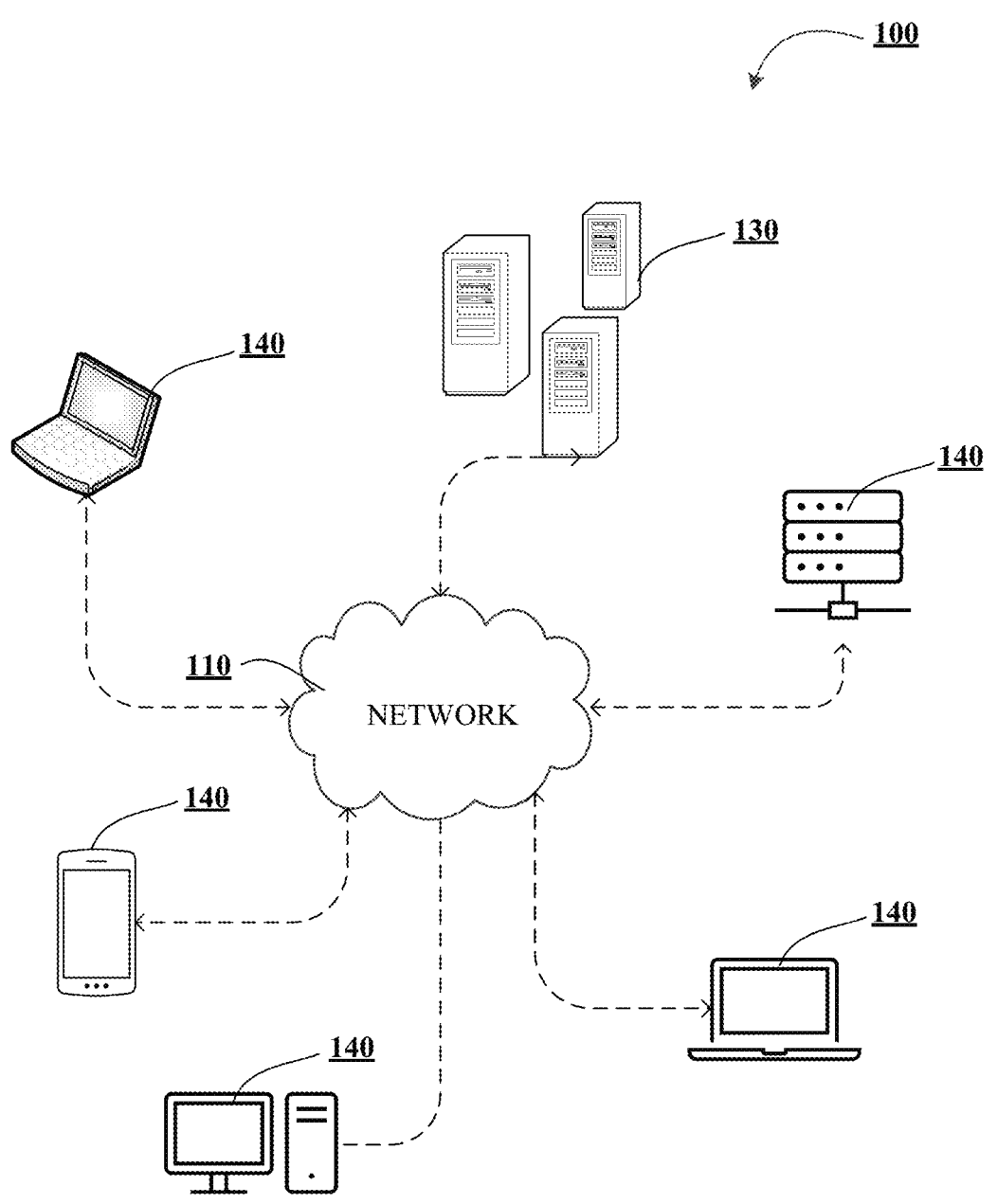
Figure 1B:
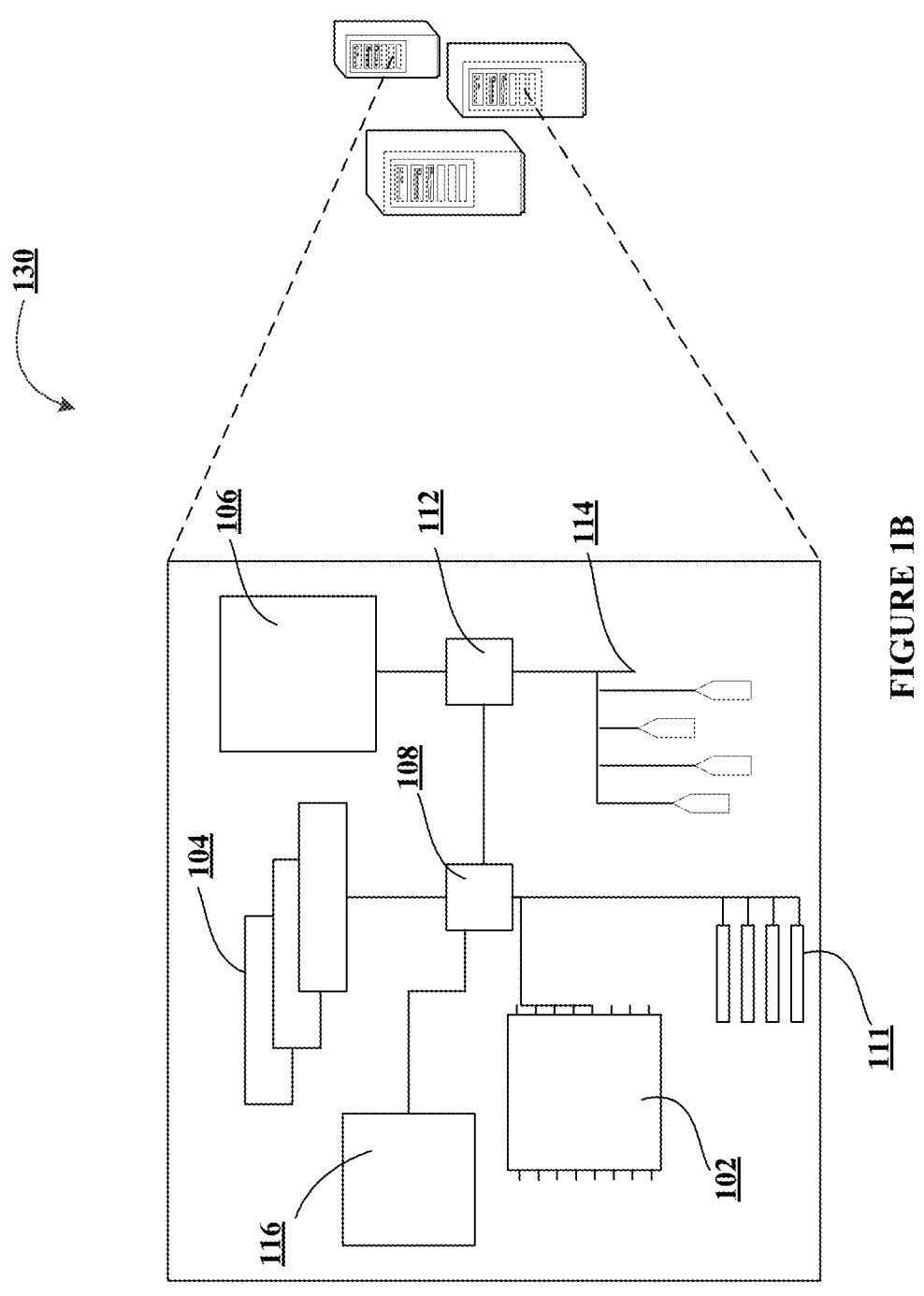
Figure 1C:
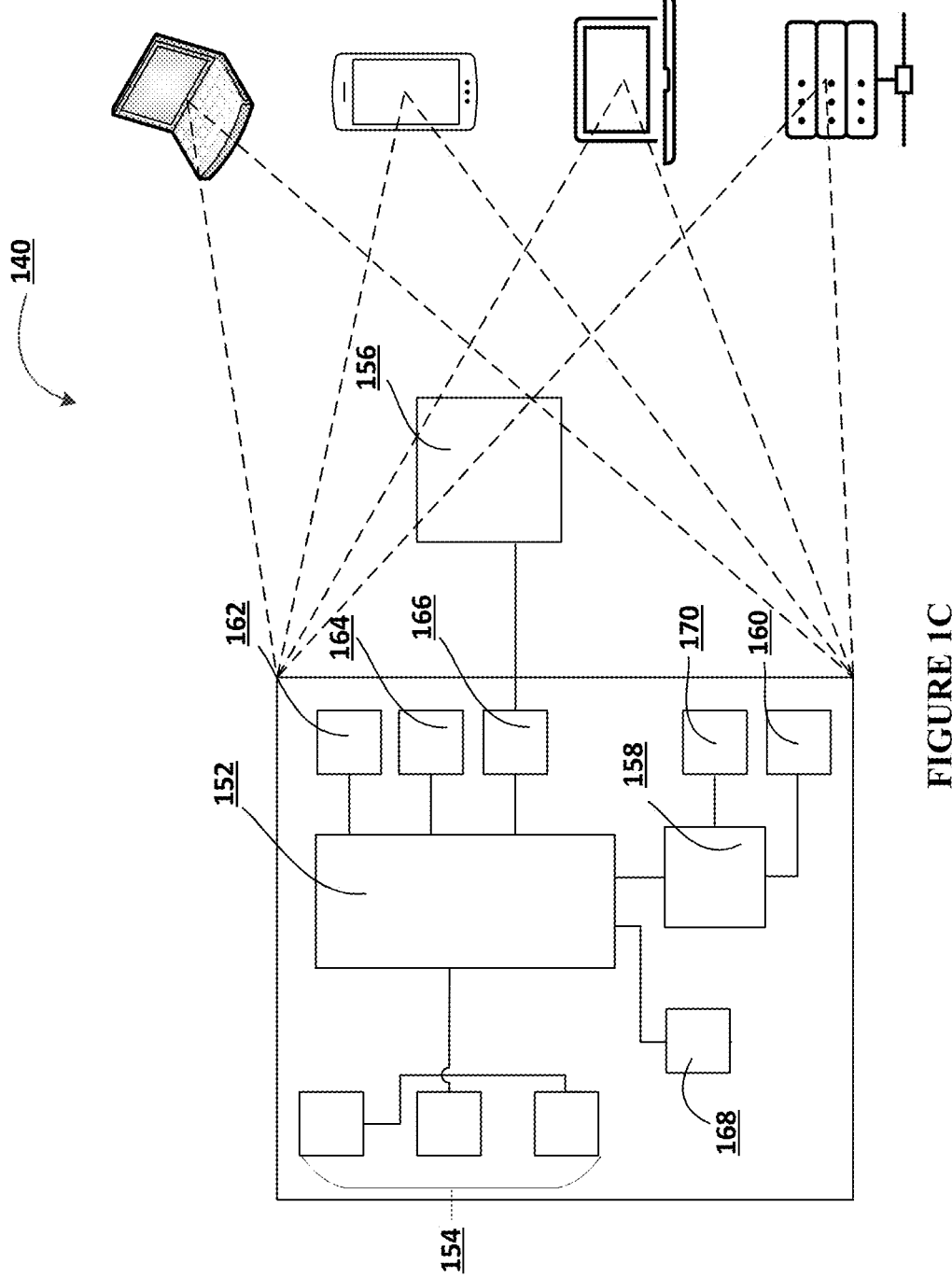

FIGS. 1A-1C illustrates technical components of an exemplary distributed computing environment for real-time overload detection using image processing analysis, in accordance with an embodiment of the disclosure;

FIG. 2 illustrates a process flow for real-time overload detection using image processing analysis, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, "device" may refer to any computing component (e.g., servers, switches, end-point devices, and/or the like), process, or application that may be part of the computing environment. In some embodiments, the device may be involved in data movement within the computing environment. It is not uncommon for entities to implement telemetry based performance monitoring on each device to visualize, monitor, optimize, incident identification, and report on the health and availability of the device during operation. To this end, entities use measurable outputs capable of capturing performance of a device—such as device metrics, network flow data, packet data, and/or the like to determine a resiliency status for each device at each time instant. In some cases, entities employ data visualization techniques to graphically represent the performance parameters (both numerical and non-numerical parameters) and determine an operational status of the device to preemptively identify instances of device malfunction using the graphical representation.

Embodiments of the present disclosure provides a rules-based analysis to determine the likelihood of the malfunction (e.g., due to overheating) of a device based on a previous expert analysis of a historical image(s) of same and/or similar devices and the comparison of the real-time image to the rules generated from the expert analysis.

FIGS. 1A-1C illustrate technical components of an exemplary distributed computing environment for real-time overload detection using image processing analysis 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130)

and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow for real-time overload detection using image processing analysis 200, in accordance with an embodiment of the disclosure. As shown in block 202, the process flow includes receiving a first set of images associated with a device, wherein the one or more images are associated with a resiliency status of the device. As described herein, the resiliency status of the device may refer to an operational status of the device indicating its ability to perform allocated operational functions at a particular time instant. In some embodiments, data visualization techniques may be used to pictographically represent the resiliency status of the device. To this end, the system may capture snapshots of images representing the performance telemetry of the device. In some embodiments, the images may be captured at period time intervals during a first time period. In doing so, the system may be able to visually represent any progressive changes in the performance telemetry of the device that may inform the resiliency status, or any change thereof.

In one example, each performance parameter used to determine the resiliency status of the device may compared to a performance threshold and subsequently be represented as a heat map in warm-to-cool colors depending on how the performance parameter falls relative to the performance threshold. Each performance parameter may have a performance threshold that is predetermined. In particular embodiments, if the value of the performance parameters keeps increasing relative to the performance threshold, the resulting heat map may show the performance parameter in warm colors. On the other hand, if the value of the performance parameters keeps decreases relative to the performance threshold, the resulting heat map may show the performance parameter in cool colors. Accordingly, the first set of images, in some embodiments, may be a collective heat map representation of the performance parameters of the device.

Next, as shown in block 204, the process flow includes deploying, using a machine learning (ML) subsystem, a trained ML model on the first set of images of the device. A trained ML model may refer to a mathematical model generated by machine learning algorithms based on training data, to make predictions or decisions without being explicitly programmed to do so. In some embodiments, to train the ML model, the system may retrieve sets of images associated with the device. For each set of images associated with the device, the system may receive, from a second user input device (e.g., an expert computing device), a known resiliency status of the device. These sets of images associated with the device and the corresponding known resiliency statuses for the sets of images associated with the device may form a feature set that is used to train the ML model. In some other embodiments, to train the ML model, the system may retrieve sets of images associated with devices that are substantially similar to the device. For each set of images associated with devices that are substantially similar to the device, the system may receive, from the second user input device (e.g., an expert computing device), a known resiliency status of the device. These sets of images associated with devices that are substantially similar to the device and the corresponding known resiliency statuses for the sets of images associated with devices that are substantially similar to the device may form a feature set that is used to train the ML model.

In some embodiments, only sets of images associated with the device and the corresponding known resiliency statuses for the sets of images associated with the device are used to train the ML model. In some other embodiments, only the sets of images associated with devices that are substantially similar to the device and the corresponding known resiliency statuses for the sets of images associated with devices that are substantially similar to the device are used to train the ML model. In still other embodiments, both sets of images associated with the device and the corresponding known resiliency statuses for the sets of images associated with the device and the sets of images associated with devices that are substantially similar to the device and the corresponding known resiliency statuses for the sets of images associated with devices that are substantially similar to the device are used to train the ML model.

The ML model represents what was learned by the selected machine learning algorithm and represents the rules, numbers, and any other algorithm-specific data structures required for decision-making. Selecting the right machine learning algorithm may depend on a number of different factors, such as the problem statement and the kind of output needed, type and size of the data, the available computational time, number of features and observations in the data, and/or the like. ML algorithms may refer to programs that are configured to self-adjust and perform better as they are exposed to more data. To this extent, ML algorithms are capable of adjusting their own parameters, given feedback on previous performance in making prediction about a dataset.

The ML algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

The ML model may be trained using repeated execution cycles of experimentation, testing, and tuning to modify the performance of the ML algorithm and refine the results in preparation for deployment of those results for consumption or decision making. The ML model may be tuned by dynamically varying hyperparameters in each iteration (e.g., number of trees in a tree-based algorithm or the value of alpha in a linear algorithm), running the algorithm on the data again, and then comparing its performance on a validation set to determine which set of hyperparameters results in the most accurate model. The accuracy of the model is the measurement used to determine which set of hyperparameters is best at identifying relationships and patterns between variables in a dataset based on the input, or training data. A fully trained ML model is one whose hyperparameters are tuned and model accuracy maximized.

Next, as shown in block 206, the process flow includes determining, using the trained ML model, a change in the resiliency status of the device based on the first set of images. In example embodiments, the initial resiliency status (e.g., first resiliency status) of the device may indicate that the device is operational. By deploying the trained ML model on the first set of images, the system may subsequently determine that the resiliency status of the device has changed from its initial resiliency status to a resiliency status (e.g., second resiliency status) that indicates that the device is likely to malfunction. In some embodiments, the second resiliency status may include a confidence level that may quantify the likelihood of malfunction. The confidence level associated with the resiliency status is continuously compared to a threshold value to determine whether the device is indeed likely to malfunction. If the confidence level associated with the resiliency status meets a status threshold, the system may update the resiliency status of the device to the second status. In other example embodiments, the initial resiliency status (e.g., first resiliency status) of the device may indicate that the device is operational. By deploying the trained ML model on the first set of images, the system may subsequently determine that the resiliency status of the device has changed from its initial resiliency status to a resiliency status (e.g., third resiliency status) that indicates that the device is at capacity. Over time, the resiliency status of the device may revert from the third resiliency status to the first resiliency status indicating that the device is no longer at capacity and is operational. In this way, the system may continuously deploy the trained ML model on the images associated with the performance telemetry of the device to determine the current resiliency status of the device.

Next, as shown in block 208, the process flow includes generating a notification indicating the change in the resiliency status of the device. In some embodiments, the notification may include one or more actions associated with the change in the resiliency status of the device. In one example, the actions associated with the overall resiliency status may include a control input configured to cause a change in the operational state of the device (e.g., turn off an operational device).

Next, as shown in block 210, the process flow includes transmitting control signals configured to cause a first user input device to display the notification. In some embodiments, as part of the notification, the system may present the user with options to subsequently execute the actions.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for real-time overload detection using image processing analysis, the system comprising:

a processing device;

a non-transitory storage device containing instructions that, when executed by the processing device, cause the processing device to:

periodically capture a resiliency status of a device;

transform the resiliency status of the device into a first set of images, wherein transforming further comprises:

comparing each performance parameter of the device to a corresponding performance threshold; and mapping each performance parameter to a color spectrum in a heat map, wherein performance parameters that exceed their corresponding performance thresholds are mapped to warm colors in the color spectrum according to a value of the performance parameters relative to the corresponding performance thresholds, and performance parameters that do not exceed their corresponding performance thresholds are mapped to cool colors in the color spectrum according to the value of the performance parameters relative to the corresponding performance thresholds;

deploy, using a machine learning (ML) subsystem, a trained ML model on the first set of images of the device;

determine, using the trained ML model, a change in the resiliency status of the device based on the first set of images to preemptively identify instances of device malfunction;

generate a notification indicating the change in the resiliency status of the device; and transmit control signals configured to cause a first user input device to display the notification, wherein the notification comprises one or more actions configured to cause a change in the resiliency status of the device, wherein the change comprises at least turning off the device.

2. The system of claim 1, wherein, the instructions, when executed, further cause the processing device to:

retrieve one or more sets of images associated with the device;

receive, from a second user input device, one or more known resiliency statuses of the device corresponding to the one or more sets of images associated with the device;

generate a first feature set using the one or more sets of images associated with the device and the one or more known resiliency statuses corresponding to the one or more sets of images associated with the device; and train an ML model using the first feature set to generate the trained ML model.

3. The system of claim 2, wherein, the instructions, when executed, further cause the processing device to:

retrieve one or more sets of images associated with one or more peer devices;

receive, from the second user input device, one or more known resiliency statuses of the one or more peer devices corresponding to the one or more sets of images associated with the one or more peer devices;

generate a second feature set using the one or more sets of images associated with one or more peer devices, and the one or more known resiliency statuses corresponding to the one or more sets of images associated with the one or more peer devices; and train the ML model using the second feature set to generate the trained ML model.

4. The system of claim 3, wherein, the instructions, when executed, further cause the processing device to:

train the ML model using the first feature set and the second feature set to generate the trained ML model.

5. The system of claim 1, wherein the first set of images are periodic snapshots representing performance telemetry of the device, wherein the first set of images are captured at period time intervals during a first time period.

6. The system of claim 1, wherein, the instructions, when executed, further cause the processing device to:

determine a first resiliency status of the device, wherein the first resiliency status indicates that the device is currently operational; and determine, using the trained ML model, that resiliency status of the device has changed from the first resiliency status to a second resiliency status, wherein the second resiliency status indicates that the device is malfunctioning based on the first set of images.

7. A computer program product for real-time overload detection using image processing analysis, the computer program product comprising a non-transitory computer-readable medium comprising code causing an apparatus to:

periodically capture a resiliency status of a device;

transform the resiliency status of the device into a first set of images, wherein transforming further comprises:

comparing each performance parameter of the device to a corresponding performance threshold; and mapping each performance parameter to a color spectrum in a heat map, wherein performance parameters that exceed their corresponding performance thresholds are mapped to warm colors in the color spectrum according to a value of the performance parameters relative to the corresponding performance thresholds, and performance parameters that do not exceed their corresponding performance thresholds are mapped to cool colors in the color spectrum according to the value of the performance parameters relative to the corresponding performance thresholds;

deploy, using a machine learning (ML) subsystem, a trained ML model on the first set of images of the device;

determine, using the trained ML model, a change in the resiliency status of the device based on the first set of images to preemptively identify instances of device malfunction;

generate a notification indicating the change in the resiliency status of the device; and transmit control signals configured to cause a first user input device to display the notification, wherein the notification comprises one or more actions configured to cause a change in the resiliency status of the device, wherein the change comprises at least turning off the device.

8. The computer program product of claim 7, wherein the code further causes the apparatus to:

retrieve one or more sets of images associated with the device;

receive, from a second user input device, one or more known resiliency statuses of the device corresponding to the one or more sets of images associated with the device;

generate a first feature set using the one or more sets of images associated with the device and the one or more known resiliency statuses corresponding to the one or more sets of images associated with the device; and train an ML model using the first feature set to generate the trained ML model.

9. The computer program product of claim 8, wherein the code further causes the apparatus to:

retrieve one or more sets of images associated with one or more peer devices;

receive, from the second user input device, one or more known resiliency statuses of the one or more peer devices corresponding to the one or more sets of images associated with the one or more peer devices;

generate a second feature set using the one or more sets of images associated with one or more peer devices, and the one or more known resiliency statuses corresponding to the one or more sets of images associated with the one or more peer devices; and train the ML model using the second feature set to generate the trained ML model.

10. The computer program product of claim 9, wherein the code further causes the apparatus to:

train the ML model using the first feature set and the second feature set to generate the trained ML model.

11. The computer program product of claim 7, wherein the first set of images are periodic snapshots representing performance telemetry of the device, wherein the first set of images are captured at period time intervals during a first time period.

12. The computer program product of claim 7, wherein the code further causes the apparatus to:

determine a first resiliency status of the device, wherein the first resiliency status indicates that the device is currently operational; and determine, using the trained ML model, that resiliency status of the device has changed from the first resiliency status to a second resiliency status, wherein the second resiliency status indicates that the device is malfunctioning based on the first set of images.

13. A method for real-time overload detection using image processing analysis, the method comprising:

periodically capturing a resiliency status of a device;

transforming the resiliency status of the device into a first set of images, wherein transforming further comprises:

comparing each performance parameter of the device to a corresponding performance threshold; and mapping each performance parameter to a color spectrum in a heat map, wherein performance parameters that exceed their corresponding performance thresholds are mapped to warm colors in the color spectrum according to a value of the performance parameters relative to the corresponding performance thresholds, and performance parameters that do not exceed their corresponding performance thresholds are mapped to cool colors in the color spectrum according to the value of the performance parameters relative to the corresponding performance thresholds;

deploying, using a machine learning (ML) subsystem, a trained ML model on the first set of images of the device;

determining, using the trained ML model, a change in the resiliency status of the device based on the first set of images to preemptively identify instances of device malfunction;

generating a notification indicating the change in the resiliency status of the device; and transmitting control signals configured to cause a first user input device to display the notification, wherein the notification comprises one or more actions configured to cause a change in the resiliency status of the device, wherein the change comprises at least turning off the device.

14. The method of claim 13, wherein the method further comprises:

retrieving one or more sets of images associated with the device;

receiving, from a second user input device, one or more known resiliency statuses of the device corresponding to the one or more sets of images associated with the device;

generating a first feature set using the one or more sets of images associated with the device and the one or more known resiliency statuses corresponding to the one or more sets of images associated with the device; and training an ML model using the first feature set to generate the trained ML model.

15. The method of claim 14, wherein the method further comprises:

retrieving one or more sets of images associated with one or more peer devices;

receiving, from the second user input device, one or more known resiliency statuses of the one or more peer devices corresponding to the one or more sets of images associated with the one or more peer devices;

generating a second feature set using the one or more sets of images associated with one or more peer devices, and the one or more known resiliency statuses corresponding to the one or more sets of images associated with the one or more peer devices; and training the ML model using the second feature set to generate the trained ML model.

16. The method of claim 15, wherein the method further comprises:

training the ML model using the first feature set and the second feature set to generate the trained ML model.

17. The method of claim 13, wherein the first set of images are periodic snapshots representing performance telemetry of the device, wherein the first set of images are captured at period time intervals during a first time period.

\* \* \* \* \*